Dec. 26, 1939. M. J. WALL ET AL 2,184,479
WELDING TIP
Filed Jan. 29, 1937
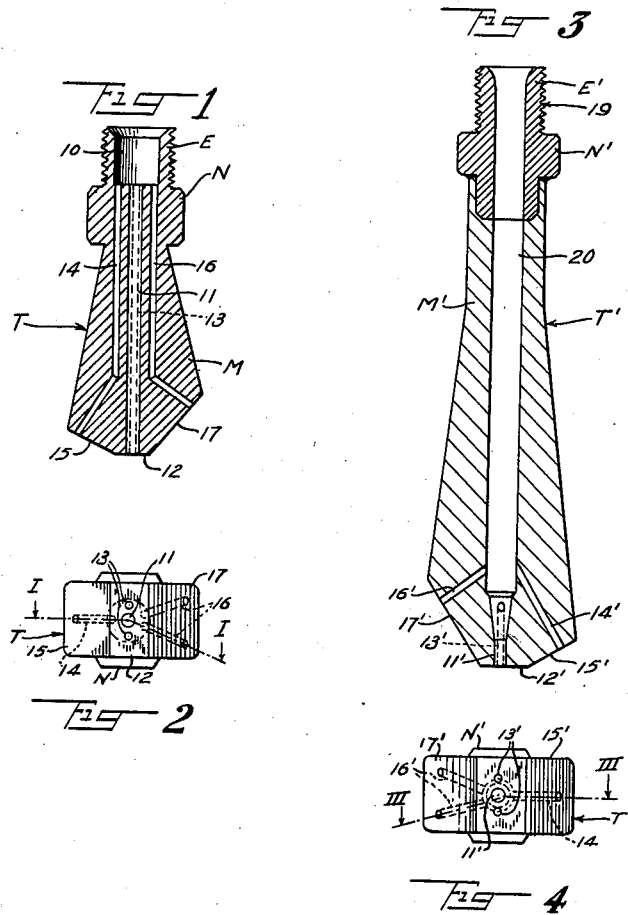
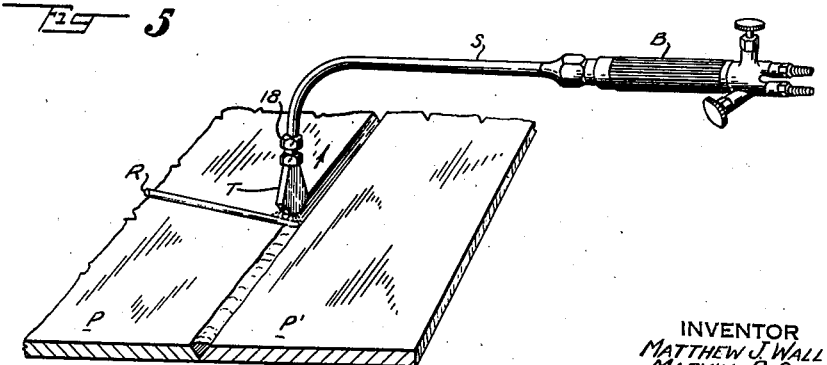
INVENTOR
MATTHEW J. WALL
MARVIN R. SCOTT
BY
ATTORNEY Patented Dec. 26, 1939

2,184,479

UNITED STATES PATENT OFFICE 2,184,479

WELDING TIP

Matthew J. Wall, Jersey City, and Marvin R. Scott, Elizabeth, N. J., assignors to Oxweld Acetylene Company, a corporation of West Virginia Application January 29, 1937, Serial No. 122,902

2 Claims. (Cl. 113—59)

This invention relates to a welding tip, more particularly to a tip wherein a plurality of jets are employed to facilitate rapid welding.

The economy of any welding process is determined largely by the welding speed and the amount of metal deposited per unit length of weld. Welding speed can be increased by preheating the welding rod and the V, and by preparation of the base metal surfaces to provide for a minimum melting back of the V and to require a minimum stirring of the puddle. In the past, therefore, welding operations have been performed with tips which project a plurality of jets; and tips or nozzles have been employed which, in addition to the main welding jet, project one or more work preheating jets or welding rod preheating jets, or both. However, the speed of welding with such tips or nozzles has been limited because it has always been necessary to manipulate the torch and to oscillate the welding rod in order to obtain satisfactory results. Furthermore, the use of such tips and such processes has at times resulted in the presence of oxide or other contaminating substances in the weld even after careful puddling. Moreover, a single welding jet results in but slight penetration and incomplete fusion along the entire depth of the two surfaces forming the V. For this reason, it is often necessary to move the welding tip from side to side if the beveled edges are to be brought uniformly to fusion temperature. Straight line movement of the welding tip, which is required for high speed welding, is thus impracticable in welding material of appreciable thickness where a single welding jet is employed. Finally, with slower welding speeds, there is excessive heat reflection from the weld, resulting in discomfort and lowered efficiency on the part of the operator, and distortion of the work.

It is accordingly an object of the present invention to provide a welding tip with which comparatively high welding speed may be attained with the resulting advantages referred to above. It is a further object to provide means for making welds of superior quality. Another object of the invention is to provide a tip which may be used under varying field conditions and which will be capable of performing heavy duty work while still being of small size and low weight, and imposing a minimum of fatigue upon the operator. A further object is the provision of such a tip in unitary form and having such simple and sturdy construction that it will withstand rough use and will not be easily injured or lose its adjustment.

Other objects and novel features of the invention will be apparent from the following description taken with the drawing, in which:

Fig. 1 is a longitudinal section through a tip embodying this invention, the section being taken on the line I—I of Fig. 2;

Fig. 2 is an end view of the tip illustrated in Fig. 1;

Fig. 3 is a longitudinal section through a slightly different tip, illustrating another embodiment of the invention, the section being taken on the line III—III of Fig. 4;

Fig. 4 is an end view of the tip illustrated in Fig. 3; and

Fig. 5 is a perspective view showing one method of using the tip illustrated in Figs. 1 and 2.

According to the present invention, a unitary tip is employed for projecting a welding flame, a rod preheating flame, and a work-preheating flame.

The welding flame comprises a main welding jet and two flanking jets, one on either side thereof. With the use of two small individual auxiliary welding jets of flame, one on either side of the main welding jet, the distribution of flame intensity is improved, thereby bringing to fusion temperature the entire V from top to bottom at the point of welding. It also becomes unnecessary to move the welding tip from side to side in order to obtain a proper weld and the tip may be given the straight line movement which is required for high speed welding.

One or more rod preheating jets and at least one work-preheating jet may be employed; although it is generally preferred to use at least two work-preheating jets so that the work may be heated on each side of the center line of the V.

The embodiment illustrated in Figs. 1 and 2 comprises a multi-flame welding tip T comprising a unitary metal body having a threaded connecting end E thereon, a nutlike projection N formed at the inner end of the connecting end, and a main body portion M extending forwardly from the nutlike projection N. The threaded connecting end E constitutes the surrounding wall of a cavity or chamber 10 to which welding gas may be delivered. The nutlike projection N may be grasped by a wrench when the tip is being connected to a source of welding gas by means of its threaded end.

The main body portion M is conveniently made rectangular in cross section and has opposite parallel faces on two sides thereof, the other two side faces being divergent forwardly of the nutlike projection N.

A main welding jet passage 11 extends axially through the tip from the inner end of the cavity 10 to substantially the center of a surface 12 which is perpendicular to the major axis of the tip at its forward end. Separate and identical flanking jet passages 13 extend in a direction generally parallel to the main welding jet passage 11 on either side thereof from the cavity 10 to the surface 12. The flanking jet passages are equally spaced from the main welding jet passage. The axes of the main welding jet passage and of the flanking jet passages are coplanar, lying in a plane which is substantially perpendicular to the two parallel side faces of the main body portion M, and to the direction in which the tip moves in performing a welding operation. The flanking jet passages are preferably smaller than the main welding jet passage.

A rod preheating jet passage 14 extends from the cavity 10 forwardly through the tip in a direction generally parallel to that of the main welding jet passage 11. The passage 14 changes its direction by substantially 30° within the tip and terminates in a surface 15 beveled back from the surface 12 to one of the divergent side faces and lying in a plane perpendicular to the two parallel side faces of the tip. Similarly, work-preheating jet passages 16, 16 extend from the cavity 10 forwardly through the tip in a direction generally parallel to that of the main welding jet passage 11 on the other side thereof. The work-preheating jet passages change direction by substantially 55° and terminate in a surface 17 which is beveled back from the surface 12 to meet the other divergent side face of the tip. The surface 17 also lies in a plane substantially perpendicular to the two parallel side faces of the tip.

Thus, when a combustible gas mixture is supplied under pressure to the cavity 10, it will pass to the forward part of the tip through the passages 11, 13, 14, and 16. The welding flame will then be projected by the main welding jet passage 11 from the surface 12 and by the flanking welding jet passages 13, 13 on either side of the main welding jet passage. The rod preheating jet will be projected from the surface 15 at an angle to the welding flame and the work-preheating jets will be projected by the passages 16, 16 from the surface 17 at an angle to the welding flame and to the rod preheating jet.

Fig. 5 illustrates the use of the tip T when welding together two metal plates P and P', the beveled edges of which are placed in welding position to provide a groove, such as a V. Thus the tip is attached to the stem S of a blowpipe B and is held thereon by means of the usual coupling nut 18. A welding rod R is held with one end in the V formed between the two plates. This end of the rod is also positioned adjacent the surface 15 of the tip T, so that the rod preheating jet may strike the rod. With the combustible gas or gas mixture issuing from the orifices of the tip, and ignited, the tip and the welding rod are thereupon moved backwardly as viewed in Fig. 5 of the drawing, being advanced by the backhand method. Accordingly, the two jets issuing from the ends of the work-preheating jet passages 16, 16 are projected against the faces of the two beveled edges preheating them, while the welding flame issuing from the main welding jet passage 11 and the flanking jet passages 13, 13 brings the beveled faces to fusion temperature. The flames delivered from flanking jet passages 13 impinge against each of the beveled edge faces above the bottom of the groove or V. At the same time the rod preheating jet heats the welding rod R, which is thus fused into the V where it completes the weld between the two beveled edges.

A reducing gas mixture is preferably employed, and a superior weld quality is obtained because the welding flame, including the main welding jet and the two flanking jets, envelopes the weld and protects the V from oxide formation and the molten metal from atmospheric contamination. Thus, the three jets, by insulating the V and the puddle from atmospheric contamination, tend to assure a body of deposited weld metal free from oxides and other impurities.

Furthermore, the main welding jet and the two flanking jets prepare the V and heat it uniformly, completely sweating the V ahead of the advancing weld; and the flanking jets restrain the wall of molten metal from flowing into the V until it is prepared. Thus penetration and deposition of clean metal upon a clean, properly sweated V is assured, and a weld of high strength and ductility is obtained. Finally, because of the thorough preparation, sweating of the V, and the equal distribution of heat by the main welding jet combined with the two flanking jets, a minimum fusion of the walls of the V occurs, and a relatively small angular opening (say 50° for plates and 60° for pipes) may be employed. It is accordingly possible to deposit a smaller quantity of weld metal per unit of weld length, and more rapid welding is made possible.

Since the subject tip preheats the rod, preheats the V, and prepares the V simultaneously, and since the arrangement of the flames practically eliminates the necessity for removal of impurities by puddling, it is necessary for the welder merely to maintain the proper relative positions of his blowpipe and his welding rod, and to move them together along the seam. Thus a welding speed greatly in excess of the usual speeds is made possible.

The embodiment illustrated in Figs. 3 and 4 operates upon the same principle. In this form of the invention, a longer tip T' is employed having a separate nipple 19 welded at its upper end to provide the threaded stem E' and the nut-like projection N'. Instead of separate passages extending clear through the tip, a central passage 20 extends from the nipple 19 to a point adjacent the front of the tip where a main welding jet passage 11', a pair of flanking jet passages 13', 13', a welding rod preheating passage 14', and a pair of work-preheating passages 16', 16' branch off therefrom. The passages 14' and 16', 16' stand at substantially 30° and 55° respectively to the direction of the main welding jet passage 11', and diverging auxiliary welding jets are provided by the passages 13', 13'. Clearly the embodiment illustrated in Figs. 3 and 4, might be substituted for the tip T which is shown in Fig. 5 and the operation might thereupon proceed as already described.

The embodiments here disclosed and the method which has been outlined are presented merely to indicate how the invention may be applied. Obviously, for instance, the invention is not limited to welding straight seams between plane plates. Other forms of the invention, differing in detail but not in principle from those here disclosed, will, of course, suggest themselves to those skilled in the art.

We claim:
1. A multi-flame welding tip comprising a uni- tary metal body having: a combustible gas inlet chamber; a main gas outlet passage connected to and coaxial with said chamber and having an orifice adapted to discharge a main welding jet centrally into a groove, such as a V, formed by bevelled edges of metal plates to be welded together; a rod-preheating gas outlet passage connected to said chamber and having at least its outlet orifice portion inclined relatively to said main passage to discharge a preheating jet against a welding rod that is being fed into the welding zone in said groove; a pair of work-preheating gas passages connected to said chamber and having at least their outlet portions inclined relatively to said main gas passage, to discharge a pair of preheating jets against the bevelled edges of the metal plates to be welded in equally spaced relation to said main welding jet; and a pair of separate and identical gas outlet passages connected to said chamber and having outlet orifices independent of and of smaller diameter than the outlet orifice of said main outlet passage, such independent orifices being equally spaced from opposite sides of said main gas passage and being arranged and adapted to discharge two auxiliary welding jets independent of and of smaller size than the main welding jet but adjacent thereto and in such manner that one auxiliary welding jet impinges against each of said plate edges above the bottom of the V to assist in the preparation of the V while restraining the wall of molten metal until the surfaces of the V are suitably prepared and, in cooperation with said main welding jet, completely and simultaneously superficially melting both walls of the V from top to bottom adjacent the welding zone.

2. A multi-flame welding tip comprising a unitary metal body having: a combustible gas inlet chamber; a main gas outlet passage connected to and coaxial with said chamber and having an orifice adapted to discharge a main welding jet centrally into a groove, such as a V, formed by bevelled edges of metal plates to be welded together; a rod-preheating gas outlet passage connected to said chamber and having at least its outlet orifice portion inclined relatively to said main passage to discharge a preheating jet against a welding rod that is being fed into the welding zone in said groove; a pair of work-preheating gas passages connected to said chamber and having at least their outlet portions inclined relatively to said main gas passage, to discharge a pair of preheating jets against the bevelled edges of the metal plates to be welded in equally spaced relation to said main welding jet; and a pair of separate and identical gas outlet passages connected to said chamber and having outlet orifices independent of the outlet orifice of said main outlet passage, such independent orifices being equally spaced from opposite sides of said main gas passage and being arranged and adapted to discharge two divergent auxiliary welding jets independent of the main welding jet but adjacent thereto and in such manner that one auxiliary welding jet impinges against each of said plate edges above the bottom of the V to assist in the preparation of the V while restraining the wall of molten metal until the surfaces of the V are suitably prepared and, in cooperation with said main welding jet, completely and simultaneously superficially melting both walls of the V from top to bottom adjacent the welding zone.

MATTHEW J. WALL.
MARVIN R. SCOTT.